2,824,793

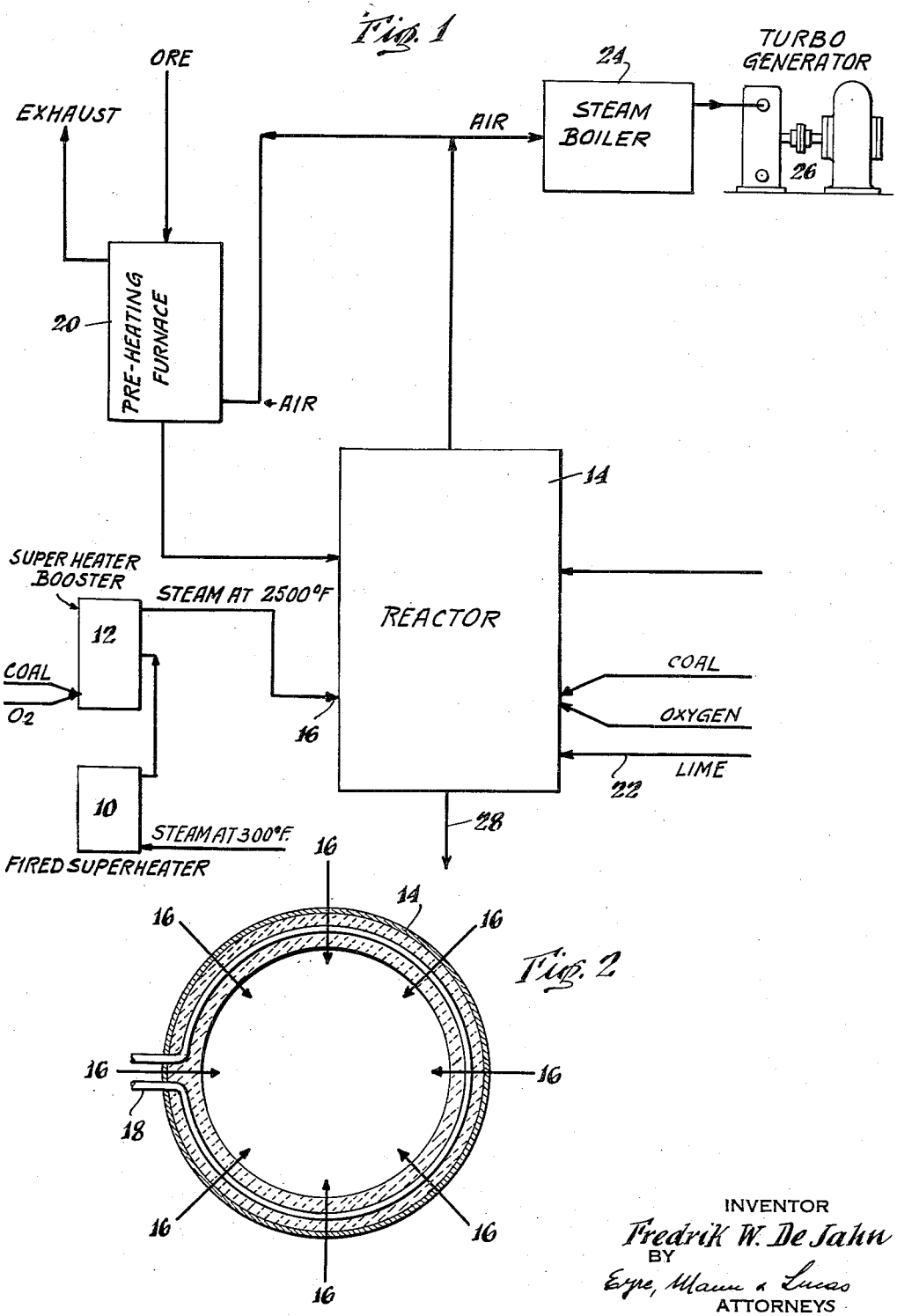

PROCESS FOR PRODUCING STEEL BY HIGH TEMPERATURE GASEOUS REDUCTION OF IRON OXIDE

Fredrik W. de Jahn, Scarsdale, N. Y., assignor of one-half to Alan N. Mann, Scarsdale, N. Y.

Application November 27, 1956, Serial No. 624,646

8 Claims. (Cl. 75—40)

This invention relates to a method of reducing iron ore (iron oxide) which appears to be more efficient and less expensive, and certainly demands less expensive equipment than the present usual practice of reducing the ore in a blast furnace.

According to this invention, powdered coal, oxygen and superheated steam are sprayed into a reaction chamber and caused to react (that is burn) with evolution of heat and the formation of a gas mixture in the atmosphere, consisting primarily of a mixture of CO and hydrogen. A minor proportion of $CO_2$ will also be present. The reaction is so conducted that a flame temperature of from about 3000° F. to 4000° F., and preferably from 3000° F. to 3600° F., is obtained in the reaction zone, but some of the heat generated is used up in raising the temperature of the ore and melting the iron so that the effective temperature is only about 3000° F. This reaction is preferably carried on in the lower part of a chamber of considerable height and fine granules of hot but not sintered iron ore are sprayed into the upper part of the reaction chamber and fall down through the rising hot gases from the initial reaction which move upwardly at a relatively low velocity. As the particles fall, reduction takes place and at the same time the particles are progressively melted. As a result, iron substantially free from carbon can be drawn off from the bottom of the reaction chamber and is available for use directly in an electric steel furnace. The matter of temperature control in the reaction zone is of the utmost importance. It certainly must be above the melting point of iron (about 2790° F.) whereas if the temperature goes too high, the life of the furnace lining will be too short to be commercial. Actually, the heat should be so controlled that the temperature of the iron is held as close to the melting point as possible and should never be allowed to rise above 3400° F.

Inasmuch as it will ordinarily be desirable to introduce lime into the melting or molten mass in order to form a proper slag with the silica present, such lime may be introduced at any desired point in the operation. Thus it may be introduced with the powdered coal or it may be introduced slightly below the level at which the coal, oxygen and steam are introduced. This has the advantage of bringing the lime out of the gas current so that less of it will be carried off as dust.

In order to carry out my process, proper proportioning and preparation of the reactants within permissible limits is a primary factor.

The ore to be employed should be in the form of small particles but it is better that it should not be down to the size of dust, as otherwise there may be undue losses through the dust being carried off in the gas stream. Today, much of the iron ore is prepared by grinding low-grade ore and concentrating with a magnetic separator, after which the powder is pelletized and calcined. Such pellets can readily be crushed and the crushed pellets serve very well for the purpose of this invention. In this case a desirable size would be from about 1/16" in diameter up to 3/8" in diameter. It is also helpful if the calcination process is so carried out that the ore is converted from magnetite ($Fe_3O_4$) to hematite ($Fe_2O_3$). The latter material appears to reduce more readily than the magnetite even though it contains a larger percentage of oxygen. This, however, does not appear to affect materially the proportions of gas used and the calculations are based upon the moles of iron present in the ore and for the purpose of simplicity the ore is calculated as magnetite. If an uncalcined ore is used, such as a high-grade natural ore that is non-porous, the particles will have to be smaller so that proper contact with the reducing gases can be had in a very short time and even with a high-grade ore, formation of porous pellets is useful.

It is an important feature of my invention that the reactions take place with great rapidity and for that reason I want to have as many of the reactions as possible exothermic. The reaction with iron oxide of a mixture of CO and hydrogen such as I use will be endothermic at ordinary temperatures but the reaction is substantially in equilibrium as regards heat at a temperature of about 1000° F. and becomes exothermic at higher temperatures. If the iron ore is introduced into the reactor at temperatures lower than 1000° F., time will have to be consumed in heating up the ore before the reaction will take place. Accordingly it is important that the iron ore be heated to a temperature of above 1000° F. but it preferably should not be heated above the temperature at which the particles substantially stick together. Otherwise, it would be too difficult to distribute them properly in the reactor. Ordinarily the temperature of the preheated particles of iron ore need not exceed 1500° F. and should not exceed 1750° F.

In reducing iron ore at temperatures above about 2000° F., $H_2$ and CO can be considered as substantially equivalent both as regards the speed of reaction and the amount of gas required. The reaction can be indicated by the following equations:

(a) $Fe_3O_4 + 4H_2 \rightarrow 3Fe + 4H_2O$ (b) $Fe_2O_3 + 3H_2 \rightarrow 2Fe + 3H_2O$ From these it follows that in theory approximately 1½ moles of reducing gas are needed for each mole of Fe. Actually, it is recognized that a substantially higher mol ratio is required and for my process there should be at least 4 moles of reducing gas for each mole of Fe present as oxide. At the high end, the amount of gas is not critical but increasing the amount of gas adds to the expense of operation and also makes it more difficult to control the top limit of temperature. Accordingly I can give as a top limit that not more than 10 moles of reducing gas should be produced for each mole of Fe. A good working limit is to use from 5 to 8 moles of reducing gas for each mole of Fe.

As regards the proportions of CO and $H_2$ in the gas mixture, considerable variation is permissible. At the temperatures used, the reducing reaction of the hydrogen is exothermic though at lower temperatures this reaction is endothermic. However, the heat generated by the use of hydrogen will be somewhat less than that generated by the CO, and by varying the proportions of hydrogen to CO a desired temperature can be attained. Generally speaking, slightly more CO than hydrogen is desirable, say about 55% CO and 45% $H_2$ but this may be varied to the point where the CO constitutes from 45% to 65% and the hydrogen from 55% to 35% of the mixture. As stated above, I find it advantageous to use from 4 to 10 moles of the gas mixture for each mole of iron. To get this result, one should burn sufficient powdered coal to have present from 3 to about 7 moles of actual carbon for each mole of Fe in the iron ore. One of the advantages of my process is that I can use a high volatile steaming coal which is ordinarily in greater supply and less expensive than the low-volatile coking coal. However, the analysis of the coal should be taken into account in proportioning the reactants, as a high volatile coal will supply some of the hydrogen for the reaction.

The amounts of oxygen and steam employed can best be calculated in terms of the carbon introduced into the reaction. Ordinarily there should be about 2 moles of $O_2$ for each 4 moles of carbon but this may vary substantially. For example, I can use between 1.7 and 2.5 moles of $O_2$ for 4 moles of carbon.

As regards the steam, I prefer to use approximately 1 mole of $H_2O$ for 4 moles of carbon but this can also be carried over substantial limits. For example, I may use from .5 to 2 moles of $H_2O$ for each 4 moles of carbon. It may be noted first of all that the amount of steam can be reduced if the volatile in the coal is very high, and generally speaking if the amount of steam is reduced, the temperature will be higher. Within the limits given, percentages of coal, oxygen and steam should be selected to give a gas mixture having the composition already stated and to give a flame temperature in the reaction zone of between 3000° F. and 4000° F. and preferably between 3200° and 3800° F.

As part of the overall reaction that takes place, I am relying upon the reaction between the steam and carbon to generate hydrogen. It is recognized that a temperature of at least 1800 F. is necessary for the so-called water gas reaction to occur. If the steam injected into the reaction zone is at ordinary temperatures, say for example below 300° F., the steam may by-pass the carbon before it reaches the reaction temperature of 1800° F. For this reason I find it important to superheat the steam to a temperature which should be at least 1800° F. and preferably may range from 2000° F. up to 3000° F. This preheating can readily be done by burning a small percentage (say from about 3% to 5%) of the carbon with oxygen in a preheating furnace and injecting the steam into the flame of this reaction. This will heat up the steam to the desired temperature and the hot steam together with the products of combustion of the oxygen and carbon can then be introduced into the main reaction zone. Of course in this instance, as before, the amount of oxygen should be so proportioned to the carbon that the carbon will be burned to CO rather than $CO_2$, though in this case there should be as little unreacted carbon as possible so that the steam will not react until it enters the main reactor. Usually it will be desirable to give the steam a preheat say up to 1200° F. to 1500° F. in a fired superheater and then give it the additional temperature by contact with the carbon-oxygen flame in what may be called a superheat booster.

This invention can be readily understood from the following illustrative example which is described in connection with the accompanying drawing. In this drawing Fig. 1 is a flow sheet of the reaction and Fig. 2 is a diagrammatic sectional view of the reaction chamber illustrating the way in which the coal, oxygen and steam are admitted to the reaction chamber.

Steam generated in a boiler, not shown, is admitted into the fired superheater 10 and continues to the superheater booster 12. In the superheat booster the steam is exposed to the direct heat of a flame formed by burning powdered coal with oxygen, the oxygen being supplied in an amount to form CO and a minimum of $CO_2$. The amount of oxygen and coal used in the superheat booster 12 should be sufficient to raise the steam temperature up to from 2000° to 3000° F.

The highly heated steam together with powdered coal and additional oxygen are admitted at various circumferential points into the lower part of a reactor 14. The burners for the coal, oxygen and steam are indicated by the numeral 16 (see Fig. 2). The combustion of the coal with the oxygen will generate a high flame temperature in the reactor 14 which is kept under control by the reaction of the steam with the carbon (which is endothermic) so that a temperature is obtained which may, for example, be somewhere between 3000° and 3600° F. In order to protect the brickwork lining of the reactor 14, cooling pipes 18 may be imbedded in the brickwork to remove part of the heat.

Low-grade iron ore is concentrated and pelletized in a standard manner. The pellets are crushed to give particles of about ⅛-inch in diameter. These particles are passed continuously through a preheating furnace 20 where they are brought up to a temperature of about 1500° F. This temperature is not critical but should not exceed the point where the particles substantially stick together.

The hot particles of iron ore are injected with a small amount of steam into the reactor 14 near the top, and like the superheated steam, oxygen and coal, may be injected at a number of points about the circumference of the reactor.

These particles of iron ore will meet the rising reducing gases generated by the combustion of the coal and will immediately start to reduce, with the evolution of some additional heat which will assist in raising the temperature of these particles so that when they finally reach the level at which the coal, oxygen and steam will be introduced into the reactor, they will be completely reduced and will have a temperature of about 3000° F. so that the iron is melted. Lime proportioned to the amount of silica in the ore is admitted into the reactor at a point below burner 16 as indicated at 22. This lime will combine with the silica of the ore to make a slag. The molten iron and slag are drawn off at the bottom of the reactor as indicated at 28 and manganese may be added in the ladle. The molten iron will be substantially free from carbon and may be introduced directly into an electric steel furnace or may be cast into ingot form for future use.

For the production of 100 tons of iron per day, a reactor is used about 70 feet high and 8 feet diameter inside the lining.

To produce 100 tons of iron per day, I use 278,400 pounds of $Fe_3O_4$, plus the weight of impurities such as silica. This ore, equivalent to 1200 pound moles, is admitted into the reactor uniformly over the period. The coal that I employ is a high volatile coal, for example one having 40% of volatile matter comprising 5.4% hydrogen and 8% oxygen. About 5.9% is ash and the carbon content is 80.7%.

To reduce 1200 pound moles of $Fe_3O_4$, 17,500 pound moles of actual carbon are used equal to about 130 tons of the coal specified. Of this amount about 5% of the coal is burned with oxygen in the superheat booster 12 and the balance is injected directly into the reactor. With the coal I use an aggregate of about 8060 moles of oxygen (258,000 pounds) and about 4390 moles (79,000 pounds) of superheated steam which is preheated in the superheat booster to a temperature of about 2500° F. As previously explained, the coal, oxygen and superheated steam are introduced through a series of burners 16 located around the periphery of the reactor.

The coal and oxygen burn immediately, and since the steam is itself above the reaction temperature necessary for it to react with the carbon, this latter reaction also takes place immediately with little or no undecomposed $H_2O$ or unreacted carbon remaining. A gas is generated containing approximately 14,500 moles of CO and 11,350 moles of $H_2$ which includes the hydrogen from the coal itself. About 3000 moles of $CO_2$ is also present and a small amount (about 400 moles) of nitrogen which is carried in with the oxygen.

The heat generated by the combustion of the coal and the reduction of the iron ore is sufficient to maintain a temperature of from 3000° F. or slightly higher, and the particles of iron ore are immediately reduced and melted. Since the reactions are exothermic (except for the reaction of the steam with carbon which serves as a temperature control) they take place with great rapidity and virtually all of the carbon is consumed. As a result, the iron drawn off from the bottom of the reactor is substantially carbon-free and can be considered as steel.

Actually, the amount of gas generated relative to the size of the reactor is not very great and the velocity of the gas going up through the reactor will only be about 20 feet per second so that relatively little dust is carried out of the furnace. This gas consists principally of CO and hydrogen and may be used for any desired purpose. Thus in the drawing I show a part of the gas as being mixed with air and burned in the super-heating furnace 20 and another part also mixed with air being burned in the steam boiler 24, which can be used to supply power as through a turbo-generator 26. The amount of power that can be developed is very substantially in excess of the power needed incident to the process and actually this process gives a good utilization of the coal employed.

In this example I have described my process as used in a small furnace but much larger reactors may be used. For example, existing blast furnaces may be altered for use with this process at very little expense and when my process is employed the yield from a blast furnace will be about double the existing yield and my process does not demand the expense of building and operating coking ovens. It is generally important to have the diameter of the reactor great enough relative to the volume of gas produced so that a low gas velocity, certainly less than 50 feet per second, results. Too high a velocity means less efficient use of the gas and a greater tendency to carry away valuable materials as dust.

What I claim is:

1. The process of reducing iron oxide which comprises burning coal with oxygen and superheated steam to produce an atmosphere comprising carbon monoxide and hydrogen and a small percentage of carbon dioxide and dropping into the combustion zone through the rising column of combustion gases, small particles of iron oxide preheated to a temperature above 1000° F. but not above the temperature at which they stick together whereby a temperature is maintained in the combustion zone high enough to raise the temperature of the charge to between the melting point of iron and 3400° F. and the iron ore is reduced and molten iron is produced.

2. A process as specified in claim 1 in which the reducing gas mixture produced in the combustion zone comprises from 65% to 45% CO and from 35% to 55% hydrogen.

3. A process as specified in claim 1 in which the amount of reducing gas mixture produced is in the proportion of from 4 to 10 moles of reducing gas for each mole of Fe introduced as iron oxide.

4. A process as specified in claim 1 in which the steam used with the oxygen for burning the coal is preheated to at least 1800° F.

5. A process as specified in claim 1 in which between 1.7 and 2.5 moles of $O_2$ and from .5 to 2 mols of $H_2O$ are used for each 4 moles of carbon.

6. A process as specified in claim 1 in which the particles of iron oxide are porous and are preheated to a temperature of between 1000° F. and 1750° F.

7. A process of reducing iron oxide which comprises burning coal with oxygen and superheated steam in the proportion of from between 1.7 and 2.5 moles of $O_2$ and between .5 and 2 moles of $H_2O$ for each 4 moles of carbon to produce a flame temperature of between 3000° and 4000° F. whereby a reducing atmosphere is produced comprising carbon monoxide and hydrogen in the ratio of between 65% and 45% CO and between 35% and 55% hydrogen, and dropping into the combustion zone through the rising column of such reducing gases small particles of iron oxide preheated to a temperature above 1000° F. but not above the temperature at which they stick together, the amount of iron ore relative to the amount of gas being such that for each mole of Fe introduced as iron oxide there are produced from 4 to 10 moles of reducing gas whereby a temperature is maintained in the combustion zone high enough to raise the temperature of the charge to between the melting point of iron and 3400° and the iron ore is reduced and molten iron is produced.

8. A process as specified in claim 7 in which the particles of iron oxide are porous so that they will be rapidly penetrated by the reducing gases.

References Cited in the file of this patent

UNITED STATES PATENTS

| | | |
|---|---|---|
| 2,669,509 | Sellers | Feb. 16, 1954 |
| 2,702,240 | Rees et al. | Feb. 15, 1955 |
| 2,729,555 | Shipley | Jan. 3, 1956 |
| 2,750,276 | Marshall | June 12, 1956 |